Figure 1:
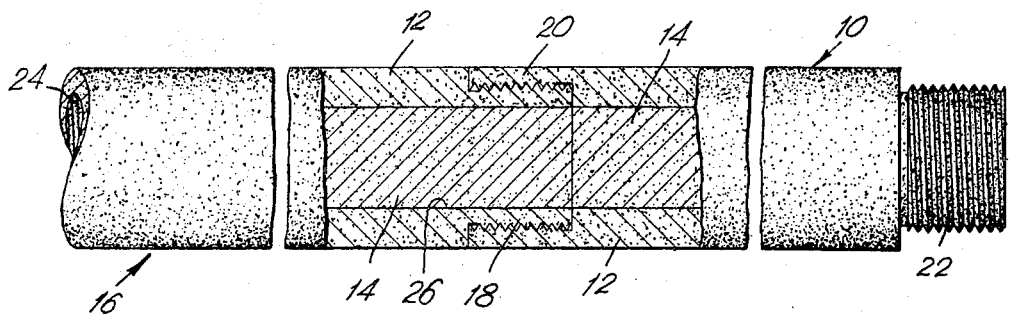

Oct. 8, 1968    M. A. ROCHE, JR    3,405,308
STRENGTHENED ARC CARBON ELECTRODE JOINTS
Filed May 12, 1966

INVENTOR
MARTIN A. ROCHE, JR.
BY
ATTORNEY

United States Patent Office 3,405,308
Patented Oct. 8, 1968

3,405,308
STRENGTHENED ARC CARBON
ELECTRODE JOINTS
Martin A. Roche, Jr., Brook Park, Ohio, assignor to
Union Carbide Corporation, a corporation of New
York
Filed May 12, 1966, Ser. No. 549,673
5 Claims. (Cl. 313—354)

The invention described herein was made in the performance of work under a NASA contract and is subject to the provisions of Section 305 of the National Aeronautics and Space Act of 1958, Public Law 85–568 (72 stat. 435; 42 U.S.C. 2457).

This invention relates to arc carbon electrodes and more particularly to arc carbon electrode joints which have been stengthened to withstand high torsional forces.

Arc carbon electrodes are employed in devices wherein the arc which is struck between a positive carbon and a negative consumable or nonconsumable cathode is employed as a source of illumination. These devices generally require that the arc function continuously for an indefinite duration of time, as for example, in a solar simulation device, or that it function continuously for a definite period of time such as in certain types of searchlight apparatus. Providing sufficient lengths of carbon electrodes to sustain an arc for the desired duration is accomplished by joining electrodes together. This method, in effect, produces endless carbons and may be accomplished in practice without interrupting the arc by threading a new carbon into the non-burning end of another carbon before the latter is entirely consumed by the arc.

A variety of carbon electrode compositions and constructions are combined in an attempt to improve the desired characteristics of a particular arc. A commonly known and often used electrode, for example, comprises a carbonaceous shell and a core each of which may be composed of a number of suitable materials. The thickness of the shell is an important consideration in this type of electrode. Normally, the diameter of the core is approximately ⅔ the outside diameter of the electrode. The shell thickness therefore is usually about ⅙ the diameter of the electrode. Electrodes which are constructed entirely of core material are not used since the core material includes metal salts which consume rapidy and develop a gas envelope (plasma) which must be contained by the shell in order to sustain arc operation.

Another important consideration in carbon electrodes which are composed of a core and a shell and which are to be joined together end to end as hereinbefore described is the strength of the bond between the core and shell. A weak union of shell and core often results in an easy breakage of the joint which is formed by connecting two electrodes end to end. In an effort to increase the strength of the connection between the shell and core, a wide variety of cements have been used. These cements are usually applied to the outer-surface of the core or on the inside surface of the shell prior to inserting the core into the shell.

It is the primary object of this invention to increase the strength of the core-to-shell bond in an arc carbon electrode.

It is another object of this invention to provide a strengthened joint when arc carbon electrodes are connected end to end.

Other objects and advantages of the invention will become apparent from the following description, taken in conjunction with the following drawing wherein the sole figure is a partial cross-sectional view of arc carbon electrodes which have been joined end to end.

Broadly, the objects of this invention are accomplished by providing a cement with an epoxy resin base between the shell and core of an arc carbon electrode. The cement may be painted on the core prior to inserting the core into the shell or the cement may be forced into the annular space between the core and shell after the core is inserted into the shell.

The cement to be employed comprises 100 parts by weight of any of the bisphenol base resins and more particularly epoxy resins in the bisphenolA-epichlorohydrin class, 1 to 30 parts by weight of any pitch in the coal tar class, 20–30 parts by weight trimellitic anhydride (TMA) and 1 to 50 parts by weight of an inert filler selected from the group consisting of graphite or coke or from the group consisting of the oxides, sulfides, carbides or borides of the metals such as titanium, aluminum, zinc, zirconium or equivalents.

The preferred composition consists of 100 parts by weight of diglycidyl ether of bisphenol A, 25 parts by weight of No. 15 vacuum coal tar pitch, 25 parts by weight TMA, and 25 parts by weight of graphite having an ash content of less than 0.5%. It is preferable that the particular epoxy resin employed have a viscosity of between 500–20,000 centipoises.

The cement may best be prepared by depositing TMA on the graphite and mixing in a 1:1 ratio by weight. This is accomplished by dissolving the TMA in acetone and adding a weight of graphite equal to that of TMA while stirring. The resulting slurry is mixed until the acetone evaporates. No. 15 vacuum pitch, having been milled through a 65 mesh screen, is then added to and mixed with the liquid epoxy resin. The component ratio of this mixture is 100 parts resin to one to 30 parts pitch. The TMA-graphite mixture and the epoxy-pitch mixture are then combined and mixed so that a ratio of 50 parts TMA-graphite to 100 parts of epoxy resin ensues. Variations in the TMA-graphite ratio may be used as a means of altering the viscosity of the cement, but the final composition must contain epoxy resin and TMA in the ratio of 100 parts to 20–30 parts respectively. The resulting cement is then applied to the cores by painting on the surface thereof or by forcing the cement between the core and shell.

After the cement is applied, it is allowed to cure in air at 25–30° C. for approximately 48 hours. It is then cured again at approximately 125° C. in air for approximately 8 hours and finally pyrolyzed in a non-oxidizing environment at a temperature between 350° C. and 480° C. attained with a 15° C. per hour rate of rise from 100° C. with an 8 hour hold at the final temperature.

Referring now to FIGURE 1, a carbonaceous electrode 10 comprising an outer shell 12 and an inner core 14 is in direct communication with a similar carbonaceous electrode 16. The electrode 16 has a threaded protrusion 18 which fits into a threaded recess 20 in the other electrode 10. On the opposite ends of these electrodes 10 and 16 are a threaded protrusion 22 and a threaded recess 24 respectively thereby providing each electrode with a protrusion at one end and a recess in the other end. A cement 26 is interposed between the outer shell 12 and the inner core 14 of the electrodes.

In order to test the effectiveness of the invention, several electrodes having a shell and a core bonded by means of a commercially available cement placed therebetween were joined end to end in a manner illustrated in FIGURE 1 and tested for torsional breaking strength. Several other electrodes having the above-described cement interposed between the core and shell, were similarly tested.

The test equipment consisted of a turret lathe with the turret replaced by torque transmitting and sensing devices which were mounted on the lathe ways. The torque transmitting members included a collet chuck and its connecting shaft cradled by two bearings which were coaxially mounted with the lathe spindle. The connecting shaft was joined directly to the shaft of a bracket-mounted torque sensing device. A strain gauge recorder amplified the signal from the electrical resistance strain gauge of the torque sensor and recorded the results on a chart. The connecting shaft was designed to allow the collet chuck to travel axially during the assembling and testing of a joint.

The electrode sections which were tested were 5″ long and included shells with a nominal wall thickness of .090″ and an outside diameter of 0.630″. The shells and cores were composed of the following materials: The shell was composed primarily of graphite (artificial) bonded together with a coal tar pitch which had been pyrolyzed at 1000–1400° C.; the core was composed of graphite (natural) and metal salts bonded together with a coal tar pitch pyrolyzed at 750–1000° C.

One group of carbon electrodes was assembled by painting the cores with a resinous cement and slipping the cores into the shells. This cement consisted of a liquid resin which was made by dissolving 50 parts by weight of phenolic resin powder in 50 parts by weight of a 1:1 mixture of furfuryl alcohol and furfuryl aldehyde. The cement was prepared by adding and mixing 10 parts by weight of graphite particles to 90 parts by weight of the phenolic resin mixture. A second group of carbon electrodes were assembled in like manner using the above-described preferred cement composition.

After each cement had been cured in air for eight hours at 100° C., each was pyrolyzed by baking to between 350° C. and 480° C. All of the carbon electrodes tested were provided with a threaded protrusion and recess so that two electrodes could be joined and subjected to the above-described torsional test. The threaded sections provided of a 9/16–18 NS truncated form machined with standard taps and dies.

The strength of the core to shell bond was determined by measuring the torque which was required to break the joints. It has been found that in joints formed by 9/16–18 NS truncated threads the protrusion exceeds the strength of the recess to which it is joined in those electrodes having an adequate bond between the shell and core. Therefore, when the torque which is required to break such joints is generated, the point of failure should be in the recess. The location of the break is then an indication of the strength of the bond between the core and shell. If the shell wall of the recess cracks, the strength of the core to shell bond is adequate. If, on the other hand, the shell portion on the protrusion breaks away from the core, the strength of the bond is inadequate. The following table lists the torque which was required to break the joints on each group of the samples tested:

TABLE I.—TORQUES AT WHICH 9/16-18 NS THREADED JOINTS RUPTURED

|  | Electrodes whose cores are bonded to shells with conventional cement | Electrodes whose cores are bonded to shells with epoxy-pitch-graphite cement |
| --- | --- | --- |
| No. samples | 20 | 10 |
| Range or torques at which joint broke, in., oz | 110–280 | 200–235 |
| Average torque, $\bar{X}$, required to break joint, in. oz | 176 | 220 |
| $\bar{X}$, $3\sigma$, in., oz | 50 | 190 |
| Samples failed at recess, percent | 0 | 100 |
| Samples failed at protrusion, percent | 100 | 0 |

As indicated in the table, the joints which were formed with the carbon electrodes having the epoxy-pitch-graphite cement securing the core to the shell were much stronger than those which were formed with electrodes whose core and shell were bonded by conventional cement. It is to be noted that the average torque required to break the joints formed with electrodes bonded with epoxy-pitch-graphite cement was considerably higher than that required to break joints formed with electrodes which employed the conventional cement. Furthermore, in all of the joints tested which were formed with electrodes using conventional cement, the breakage occurred at the protrusion, thereby further indicating the poor bond between the core and shell. Joints formed in accordance with this invention, however, had no failures due to a poor core to shell bond. Thus, it is readily apparent that joints formed on electrodes which are assembled in accordance with the principles of this invention are clearly superior to those on electrodes which are made with a conventional cement.

What is claimed is:

1. An arc carbon electrode having a core and a shell and a cement interposed therebetween, said cement comprising one hundred parts by weight of a bisphenol A-epichlorohydrin resin, one to thirty parts by weight of coal tar pitch, twenty to thirty parts by weight of trimellitic anhydride, and one to fifty parts by weight of an inert filler selected from the group consisting essentially of graphite and coke, or from the group consisting essentially of the oxides, sulfides, carbides and borides of the metals comprising titanium, aluminum, zinc and zirconium, said cement rigidly securing said core to said shell.

2. The electrode of claim 1 wherein said bisphenol A-epichlorohydrin resin is diglycidyl ether of bisphenol A.

3. The electrode of claim 2 wherein said inert filler is in an amount of 25 parts by weight.

4. The electrode of claim 3 wherein said inert filler is graphite.

5. The electrode of claim 4 wherein said trimellitic anhydride consists of 25 parts by weight.

References Cited

UNITED STATES PATENTS

| 2,093,390 | 9/1937 | Wyckoff | 313—357 X |
| 2,657,326 | 10/1953 | McCarty | 313—354 |
| 3,140,967 | 7/1964 | Kaufmann et al. | 313—357 X |
| 3,251,926 | 5/1966 | Click et al. | 313—354 |

JOHN W. HUCKERT, *Primary Examiner.*

A. J. JAMES, *Assistant Examiner.*